Figure 1:
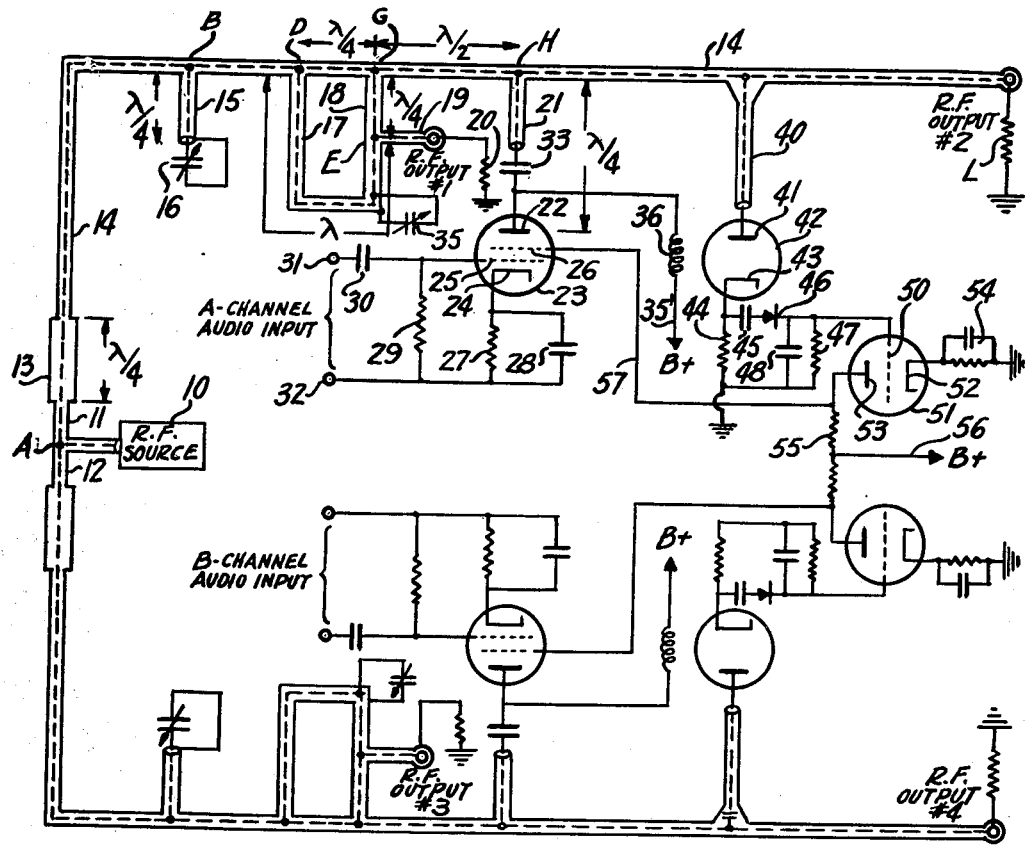

Dec. 3, 1963  F. G. YETTER  3,113,314
RADIO GUIDANCE AND LANDING SYSTEM
Filed Sept. 1, 1960

INVENTOR.
FORREST G. YETTER
BY
Gustave Miller
ATTORNEY.

United States Patent Office 3,113,314
Patented Dec. 3, 1963

3,113,314
RADIO GUIDANCE AND LANDING SYSTEM
Forrest G. Yetter, 3006 Hickory St., Alexandria, Va.
Filed Sept. 1, 1960, Ser. No. 53,559
7 Claims. (Cl. 343—109)

The present invention relates generally to radio navigational aid systems, such as an instrument landing system localizer and glide slope or course guidance ranges, and still more particularly to wholly electronic modulating systems for directional and non-directional radio navigational aids.

It is well known that in the art relating to radio instrument landing systems, it is common to utilize arrangements for modulating the transmission of RF energy in two separate and parallel channels, the latter terminating in bridge circuits which enable transmission of carrier signal and sideband signal by means of separate antennas or antenna systems. Such systems may be utilized to produce a directional radiation pattern involving two modulating frequencies, each modulating the radio frequency carrier in a different one of two parallel channels. Thereby, the difference in depth of modulation of the two modulating frequencies can be detected by a remote receiver as a function of the angle which the receiver makes with the antenna system.

In conventional localizer and glide slope transmitters it is well known to utilize parallel modulation channels wherein a radio frequency carrier is modulated by means of a mechanical modulator in the form of a rotating paddle wheel associated with a transmission line section. The mechanical modulator is utilized to effect carrier modulation by varying the standing wave ratio of a transmission line extending between a source and an antenna load. Utilization of a mechanically driven wheel is undesirable since it entails use of a motor to rotate the paddle wheels, does not provide for voice or identification modulation, is extremely susceptible to production of cross modulation between channels since it does not provide a constant load to the RF source. Furthermore such systems have severe limitations as to reliability, durability, performance, freedom from maintenance, and the like, by reason of the utilization of mechanical elements.

Briefly describing a preferred embodiment of the present invention, two parallel RF channels are utilized, each of which includes an electronic modulator. The RF energy in each channel is distributed between an artificial load and an antenna bridge in such a manner that total power supplied by the RF transmitter is constant during the modulation cycle. This involves inverse distribution of power between the artificial load and the antenna bridge, with constant total power input. The total amount of power delivered to the antenna bridge is proportioned to the standing wave ratio in a line supplying the RF power. That standing wave ratio is in turn controlled by a modulator tube connected to the line. The quantity of RF power delivered to the artificial load is controlled by unbalancing a novel RF bridge, the extent of unbalance of which is in turn proportional to the standing wave ratio. It follows that as the modulator tube varies its impedance, the distribution of energy as between the antenna and the dummy load is continuously varied, but the variation is accomplished in such sense that the total power supplied to both loads, i.e. the dummy load and the antenna, remains constant.

It is essential to the proper operation of a modulation system of the type herein described that the ratio of the percentage modulations in the two channels has continuously a one to one value, or some other pre-established ratio. Should the percentage modulation in one of the channels decrease without a corresponding decrease in the other channel, this would be interpreted at a remote receiver as corresponding with a direction change, where no such change in fact exists.

According to a feature of the present invention a measurement is made of the percentage of modulation of the carriers in each of the channels, this percentage being translated into a control signal, which in turn is supplied to the modulating tube in such sense as to maintain the percentage of modulation constant.

It is, accordingly, a broad object of the present invention to provide a novel completely electronic localizer and glide slope for an instrument landing system.

It is another object of the present invention to provide a wholly electronic goniometer capable of performing the functions of a mechanical goniometer of the type commonly employed in radio range systems, glide slope systems, and the like.

It is still another object of the present invention to provide a novel electronic modulator for modulating the energy passing down a transmission line by modifying the standing wave ratio or impedance relations on the line.

Still another object of the invention is to provide a novel electronic modulator capable of effecting division of a fixed amount of power in a transmission line as between two loads, while maintaining the total impedance as seen by a single generator driving the two loads at a constant value.

It is still another object of the present invention to provide a novel amplitude modulator for radio frequency energy which performs the function of maintaining constant percentage modulation.

It is still another object of the present invention to provide a novel modulation system consisting of a single vacuum tube or analogous control device, connected in shunt to one point of a transmission line.

It is still another object of the present invention to provide a system for modulating the energy supplied to a load connected to a bridge circuit by modifying certain impedances of the bridge circuit.

A further object of the present invention resides in the provision of a wholly electronic goniometer system, which provides modulation in parallel channels at two different tone modulating frequencies, and in which provision is made for introducing speech modulation or identification tone modulation without interrupting the tone modulations.

A very broad object of the invention is to provide a goniometer system requiring no moving parts.

Another broad object of the invention is to provide means for voice modulating localizer and glide slope radio frequency carriers of instrument landing systems.

Still another object of the invention is to provide a novel system for maintaining constant percentage modulation in a modulating system.

It is a general object of the present invention to provide a radio guidance system which has a minimum of complexity of adjustment, maximum freedom from maintenance, minimum cost of fabrication and adjustment, and minimum susceptibility to incorrect operation.

Figure 2:
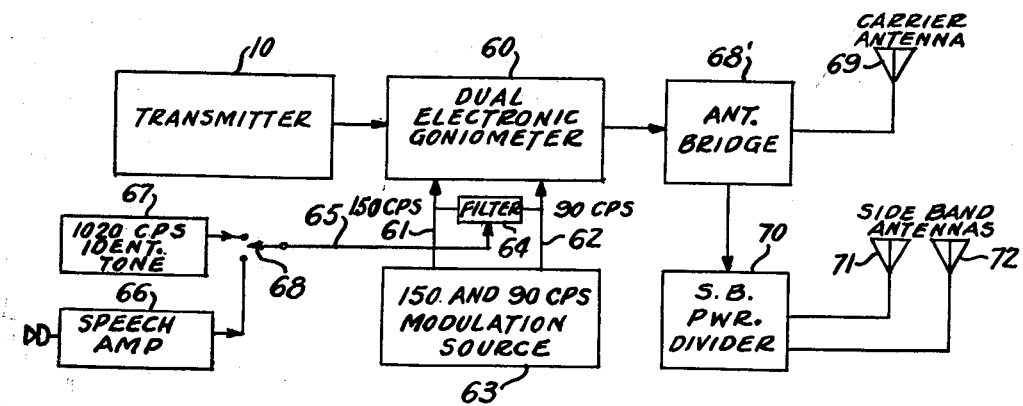

The above and still further objects, features and advantages of the present invention will become apparent upon consideration of the following detailed description of one specific embodiment thereof, especially when taken in conjunction with the accompanying drawings, wherein:

FIGURE 1 is a schematic circuit diagram of a dual channel modulator system according to the present invention; and FIGURE 2 is a block diagram of a guidance system according to the present invention.

Referring now more particularly to FIGURE 1 of the accompanying drawings, the reference numeral 10 denotes a radio frequency source of conventional character per se. The source 10 supplies power in two parallel channels 11 and 12. The channels 11 and 12 are duplicates throughout and accordingly the description will be restricted to one of the channels, the operation and construction of the remaining channel being then made obvious. The channel 11 includes a matching transformer 13, which has effectively the function of matching the impedance of a transmission line 14 extending beyond the transformer 13 to the impedance of the source 10 and its normal coupling transmission lines. Should the transmission line structure match impedance throughout, obviously the transformer 13 would become unnecessary. The transmission line 14 proceeds to a quarter wave stub 15 which is terminated by a variable condenser 16. It is the function of the stub 15, and the condenser 16, to provide adjustment for the power passing along the line 14. This is accomplished by the stub 15 and the condenser 16 varying the shunt impedance across the line 14, as seen at the circuit point B. The stub 15 being a quarter wave stub, acts as an impedance inverter. Should the far end of the stub 15 be short circuited the circuit impedance at point B is transformed to an open circuit, and correspondingly the stub 15 has no electrical effect. However, insofar as the termination of the stub 15 is not a short circuit the impedance transformation effected by the stub 15 introduces smaller than infinite impedance at the point B and thereby serves to attenuate the radio frequency energy passing along the line 14 beyond the point B. Particularly, this energy can be decreased or increased by appropriately setting the value of the condenser 16, which constitutes the termination for the stub 15.

The transmission line 14 between points B and D constitutes a random length. At the point D a branching line is introduced, and at a point G one quarter wave length along the line a further branching line 18 is introduced. The lines 17 and 18 are joined, a tap being taken at the junctions of the lines 17 and 18, which leads to a dummy RF load 20. The distance from the point D to the point E at which the tapping line 19 is taken is one wave length, whereas the distance from the point G to the point E, i.e. of the transmission line 18, is one quarter wave length.

Located one half wave length along the transmission line from the point G is a point H, from which is tapped a quarter wave length line 21 coupled to the anode 22 of a vacuum tube 23. The latter may be a conventional tetrode or pentode, and may include a cathode 24, a first control grid 25, and a second control grid 26. Cathode 24 may be connected to a suitable ground or reference point through a bias resistance 27, shunted by a bypass condenser 28 having negligible impedance at the lowest frequency of interest. A grid leak 29 may be connected between the grid 25 and the reference point, and an input signal coupling capacitor 30 may be connected in series with the control grid 25. Modulating signal may then be applied across terminals 31, 32, of which terminal 32 is connected to the ground point and terminal 31 in series with the coupling condenser 30.

The tube 23 acts as a modulating tube for energy passing along the transmission line 14. Since the anode of the tube 23 is coupled to the line 14 through a one quarter wave length section of line, an impedance inversion occurs, i.e. if the anode to ground impedance of tube 23 were zero, an infinite impedance or open circuit would be reflected to the point H, whereas if the impedance of the anode to ground circuit of the tube 23 is infinite a short circuit is transferred to the point H. In the connection the condenser 33 is a D.C. blocking condenser, but if desired may be made variable in order to enable adjustment of the stub 21.

The distance between the points G and H along the line 14 is one half wave length. Since it is known that a one half wave section of transmission line is a one to one impedance transformer, the impedances developed at the point H are transferred without change to the point G. It then follows, as the impedance of vacuum tube 23 is, in response to a modulation signal applied thereto, varied in impedance between a short circuit and an open circuit, that the point G sees a corresponding variation extending inversely however between open circuit and short circuit. If the point G presents an open circuit RF energy flows from the point D to the point E in two parallel paths, i.e. along the transmission line 14 from D to G for one quarter wave length, and down the second transmission line section 18 to E for one quarter wave length, as one of the paths, and along the one wave length section 17 as the other path. It follows that the RF energy traversing the paths 17 and 18 arrives at the point E in opposite phases and cancel, so that no energy is supplied to the dummy load 20. On the other hand when the point G looks like a short circuit, that short circuit is translated to open circuits at points D and E, which are λ/4 wave lengths distance from the point G. The short circuit at point G prevents current flowing along the stub 18, but since the points D and E are open circuited power can flow to the load 20, and for the set of circumstances described all the power flows to the load 20 and none of the power flows beyond the point H of the transmission line 14.

For intermediate values of impedance of the vacuum tube 23, i.e. points intermediate short circuit and open circuit, intermediate divisions of load as between the line 14 between the dummy load 20 and the true load L is accomplished.

It has been found desirable to provide for adjusting the electrical length of the line 17. To this end a variable condenser 35 is connected across the line 17 at a point 3λ/4 from the point D and λ/4 from the point E.

The anode 22 of vacuum tube 23 is provided with plate voltage at a constant value from a terminal 35', via a conventional RF choke 36. Control of the impedance of the tube 23 in response to percentage of modulation is accomplished by varying the voltage at the second control grid 26, in the following manner. Energy is tapped from the transmission line 14 at a point between the point H and the load L, through an untuned section of transmission line 40, which leads to the anode 41 of a diode 42, the latter includes a cathode 43 having in series therewith a cathode load 44. Across the load 44 is then developed a rectified version of the RF envelope passing along the transmission line 14. This envelope is coupled through a rectifier circuit comprising a coupling condenser 45 and a diode 46 having its anode coupled to the cathode of the diode 42 through the coupling condenser 45 and having its cathode connected to a filter circuit comprising a shunt resistance 47 and a bypass condenser 48. The voltage developed across the resistance 47 is then proportional to the peaks of the RF envelope, and assuming that the average RF energy remains constant, is proportional to the percentage modulation of the envelope. The voltage developed across the resistance 47 is applied to the grid 50 of the triode 51, having a cathode 52 and an anode 53. The cathode is biased by means of a conventional self-bias circuit 54, and the anode 53 is coupled through an anode load resistance 55 to a B+ terminal 56. The voltage at the anode 53 is directly connected by a lead 57 to the second control grid 26 of the modulator vacuum tube 23.

If, then, the voltage across the resistance 47 increases the voltage at the anode 53 will decrease, whereas if the voltage across the resistance 47 decreases the voltage at the anode 53 will increase. These changes in voltage at the second control grid 26 change the average impedance of the vacuum tube 23, and the change is effected in such sense as to maintain the percentage of modulation constant. In this sense the system acts as a servo, i.e. any increase in percentage modulation causes a change in the impedance of the vacuum tube 23 in such sense as to reduce the percentage of modulation, and inversely for an inverse change in modulation percentage.

Referring now particularly to FIGURE 2, the reference numeral 10 denotes the source 10 of FIGURE 1. The dual electronic goniometer 60 represents the two modulating channels of FIGURE 1. To the dual modulator 60 is applied, in separate channels, separate modulations by separate leads 61 and 62, these being conventionally at 150 c.p.s. and 90 c.p.s. and being derived from a modulation source 63. A coupling filtering circuit 64 is provided which is connected across the lead 61, 62 but which is essentially a high pass filter, and accordingly does not permit cross modulation of the 150 c.p.s. and 90 c.p.s. signals. On the other hand, signal input to the filter 64 is permitted via lead 65, in which case both channels 61 and 62 are subjected to signal applied via line 65. To the line 65 may be applied speech signal from a speech amplifier 66 or 1020 c.p.s. identification tone from a source of such tone 67. The latter two types of audio signal may be selectively applied to the lead 65 via manual switch 68 or voice operated relay.

The output of the electronic goniometer 60 is applied to the antenna bridge 68', which balances out the carrier at one corner leaving one half of the total side band energy which is applied to the power dividing network 70. The power dividing network 70 divides the side band energy between a dummy load and the side band antenna 71, or divides the side band energy between antennas 71 and 72 when an antenna array is used. The other corner of the antenna bridge 68' will deliver all the carrier energy and one half of the total side band energy to the carrier antenna 69. Whether one or more antennas will be utilized depends on the use which is to be made of the system, i.e. whether it is a localizer or glide slope system, and this portion of the system is essentially one which is well understood in the art and is conventional, per se, and accordingly is not further discussed.

In operation, the two modulator channels of the electronic goniometer 60 are continuously modulated by 150 c.p.s. and 90 c.p.s. signals, respectively, deriving from the modulation source 63. When desired, manipulation of the switch 68 permits simultaneously application to both channels of a 1020 c.p.s. identification tone from the tone source 67, or speech signal from the speech amplifier 66.

The two modulator channels of the dual electronic goniometer are identical except for modulation frequency, and accordingly only one of these has been described above. The modulator operates to maintain constant percentage of modulation via operation of the detector system comprising diode 46 and control tube 51, while the signal modulator tube 23 connected in shunt to the main transmission line 14, which supplies energy from the source 10 to the antenna load L, serves to modulate enregy passing along that line. A dummy load is provided which is connected to a bridge coupled to the points D and G of the transmission line 14. The effects of impedance changes of the tube 23 have inverse effects at the load L and at the dummy load 20 which is connected to the bridge, so that inverse energy flows occur at the dummy load 20 and the true load L, whereby the source 10 sees a constant load during each modulation cycle, and cross-modulation is avoided.

While I have described and illustrated one specific embodiment of my invention, it will be clear that variations of the details of construction which are specifically illustrated and described may be resorted to without departing from the true spirit and scope of the invention as define in the appended claims.

What I claim is:

1. A modulator, comprising a transmission line, said transmission line including two points separated by $\lambda/4$, where $\lambda$ is an operating wavelength, a further transmission line section joining said two points, said further transmission line section having a length $5\lambda/4$, and a load coupled to said further transmission line section at a location $\lambda/4$ from one of said points and $\lambda$ from the other of said points.

2. The combination according to claim 1 wherein is provided a variable impedance at said one of said points.

3. The combination according to claim 2 wherein said variable impedance is a vacuum tube separated from said one of said points along said transmission line by an electrical distance $3\lambda/4$.

4. A transmission line having first, second and third points therealong in sequence in the order stated between a source and a load, a variable impedance in shunt to said third point, said second point being separated from said third point by $n\lambda/2$, where $\lambda$ is an operating wave length of said line and $n$ is an integer, said first point being separated from said second point by $m\lambda/4$, where $m$ is an odd integer, a fourth point, a line of length $l\lambda$ extending from said first point to said fourth point, where $l$ is any integer, a line of length $m\lambda/4$ extending from said second point to said fourth point, and a further load connected to said fourth point.

5. A modulation system comprising a radio frequency generator, a long radio frequency transmission line coupled to said generator at one end, a first load coupled to said long transmission line at its other end, a modulator connected to said transmission line intermediate its ends, a second load coupled to said long transmission line, said long transmission line including electronic means for dividing radio frequency energy between said first and second loads while maintaining the sums of the energies to both loads constant during each modulation cycle, said electronic dividing means including means for varying the impedance of a point of said line in response to a modulating voltage, and a bridge circuit coupled between spaced parts of said line located between said first mentioned point and said generator, said second load being connected to said bridge circuit, said coupled points being spaced apart $\lambda/2$, a $5\lambda/4$ line section joining said spaced points, said second load being connected $\lambda/4$ from one of said spaced points, where $\lambda$ is the operating wave length of said line.

6. In a parallel channel goniometer, a single source of radio frequency energy, a first and a second channel coupled in parallel to said single source, an electronic amplitude modulator connected to each of said channels for modulating energy passing therealong, a dummy load operatively associated with each of said modulators, a real load operatively associated with each of said channels, means for applying a different tone modulating frequency to each of said modulators, said modulators each being arranged to maintain the total energy drain of each of said channels constant at all instants during modulation in response to said different modulating frequencies by proportioning energy flow to the dummy load and the real load of each of said channels, whereby cross modulation is minimized, and means for concurrently amplitude modulating both said channels with information supplementary to said tone modulating frequencies.

7. In a parallel channel goniometer, a single source of radio frequency energy, a first and a second channel coupled in parallel to said single source, an electronic amplitude modulator connected to each of said channels for modulating energy passing therealong, a dummy load operatively associated with each of said modulators, a real load operatively associated with each of said channels, means for applying a different tone modulating frequency to each of said modulators, said modulators each being arranged to maintain the total energy drain of each of said channels constant at all instants during modulation in response to said different modulating frequencies by proportioning energy flow to the dummy load and the real load of each of said channels, whereby cross modulation is minimized, and servo loop means in each of said channels for maintaining constant the percentage modulation produced by said modulators.

References Cited in the file of this patent

UNITED STATES PATENTS

| | | |
|---|---|---|
| 2,228,692 | Davis | Jan. 14, 1941 |
| 2,244,756 | Alford | June 10, 1941 |
| 2,301,160 | Finch | Nov. 3, 1942 |